United States Patent
Van Oorschot et al.

(10) Patent No.: US 11,185,103 B2
(45) Date of Patent: Nov. 30, 2021

(54) SYSTEM FOR STEAM PEELING OF PRODUCTS HAVING A SKIN

(71) Applicant: KIREMKO B.V. [NL/NL], Montfoort (NL)

(72) Inventors: Hendrikus Johannes Maria Van Oorschot, Montfoort (NL); Marcellinus Franciscus Maria Overbeek, Montfoort (NL)

(73) Assignee: Kiremko B.V., Montfoort (NL)

( * ) Notice: Subject to any disclaimer, the term of this patent is extended or adjusted under 35 U.S.C. 154(b) by 469 days.

(21) Appl. No.: 16/347,674

(22) PCT Filed: Nov. 3, 2017

(86) PCT No.: PCT/NL2017/050709
§ 371 (c)(1),
(2) Date: May 6, 2019

(87) PCT Pub. No.: WO2018/088893
PCT Pub. Date: May 17, 2018

(65) Prior Publication Data
US 2019/0343163 A1    Nov. 14, 2019

(30) Foreign Application Priority Data
Nov. 8, 2016 (NL) ..................... 2017743

(51) Int. Cl.
*A23N 7/00* (2006.01)
(52) U.S. Cl.
CPC .................. *A23N 7/005* (2013.01)

(58) Field of Classification Search
CPC ....................................................... A23N 7/005
(Continued)

(56) References Cited

U.S. PATENT DOCUMENTS

| 695,477 A | * | 3/1902 | McFarlane | ............. A23N 7/005 99/469 |
| 728,604 A | * | 5/1903 | Overbeck | ............. A23N 7/005 99/469 |

(Continued)

FOREIGN PATENT DOCUMENTS

WO    01/93704 A1   12/2001

OTHER PUBLICATIONS

International Search Report for International Application No. PCT/NL2017/050709 dated Mar. 19, 2018.

*Primary Examiner* — William M McCalister
(74) *Attorney, Agent, or Firm* — Suiter Swantz pc llo (57) ABSTRACT

A system for steam-peeling products including a rotatable pressure vessel having a wall surrounding a pressure space, an opening for products, and a closure member for closing the opening. A feeder feeds steam to the pressure space. An evacuator evacuates steam and condensate from the pressure space. At least one agitation member is disposed on an inner wall of the vessel for radially inward movement of products during rotation of the vessel. The at least one agitation member has an agitation body with a convex shape that together with the wall surrounds a cavity, and on a front side has at least one flow opening in the agitation body and/or between the body and the wall. Part of the wall jointly surrounds the cavity and has a flow opening to a collection tank outside of the pressure vessel.

17 Claims, 5 Drawing Sheets

(58) Field of Classification Search
USPC .......................... 99/477, 478, 479, 584, 593
See application file for complete search history.

(56) References Cited

U.S. PATENT DOCUMENTS

| | | | | |
|---|---|---|---|---|
| 2,490,112 A * | 12/1949 | Winters | ................. | A23P 30/32 |
| | | | | 99/470 |
| 3,017,758 A * | 1/1962 | Haverstock | ............ | D03D 25/00 |
| | | | | 68/19 |
| 3,292,259 A * | 12/1966 | Lambert | ................. | A01J 25/11 |
| | | | | 99/459 |
| 3,526,260 A * | 9/1970 | Weiberg | ................. | A23N 7/005 |
| | | | | 126/369 |
| 3,815,491 A * | 6/1974 | Guyer | ................. | A23N 17/004 |
| | | | | 99/468 |
| 4,091,722 A * | 5/1978 | Kunz | .................... | A23N 7/005 |
| | | | | 99/479 |
| 4,101,682 A * | 7/1978 | Kunz | .................... | A23N 7/005 |
| | | | | 426/482 |
| 4,222,322 A * | 9/1980 | van der Schoot | ..... | A23N 7/005 |
| | | | | 99/467 |
| 4,393,756 A * | 7/1983 | van der Schoot | ..... | A23N 7/005 |
| | | | | 99/348 |
| 4,478,863 A | 10/1984 | van der Schoot | | |
| 4,632,025 A * | 12/1986 | van der Schoot | ..... | A23N 7/005 |
| | | | | 99/348 |
| 4,707,372 A * | 11/1987 | Catelli | ................... | A23N 7/005 |
| | | | | 426/481 |
| 5,454,300 A * | 10/1995 | Rainey | .................... | A23N 4/12 |
| | | | | 99/537 |
| 5,947,015 A * | 9/1999 | Laurbak | ................. | A22C 9/004 |
| | | | | 99/535 |
| 6,234,066 B1 * | 5/2001 | Zittel | ....................... | A23L 5/13 |
| | | | | 99/348 |
| 6,305,271 B1 * | 10/2001 | Overbeek | ............. | A23N 7/005 |
| | | | | 99/348 |
| 7,776,374 B2 * | 8/2010 | Nielsen | ................. | A23B 4/325 |
| | | | | 426/281 |
| 8,047,902 B2 * | 11/2011 | Van Esbroeck | ........ | A22C 9/005 |
| | | | | 452/141 |

* cited by examiner

SYSTEM FOR STEAM PEELING OF PRODUCTS HAVING A SKIN

TECHNICAL FIELD AND BACKGROUND

The invention relates to a system for the steam-peeling of products having a skin, comprising a pressure vessel rotatable about a rotational axis in a rotational direction and having a wall which surrounds a pressure space of the pressure vessel, wherein in the wall is provided a through opening for feeding products into the pressure space via the through opening and for evacuating products from the pressure space via the through opening, the pressure vessel further comprising a closure member for closing off the through opening, the system further comprising feed means for feeding steam to the pressure space, evacuation means for evacuating steam and condensate from the pressure space, wherein the pressure vessel, on the inner side of the wall, is provided with at least one agitation member for the radially inward movement of products during rotation of the pressure vessel about the rotational axis.

During the steam-peeling process, steam is fed to the rotating pressure vessel containing the products to be peeled. The steam which is fed during operation to the pressure space will inevitably cool, whereby condensate is formed. The presence of condensate in the pressure vessel has a negative influence on the steam-peeling process, because the condensate can hamper a rapid heat exchange between steam and product. It is therefore sensible to evacuate the condensate while the system is active and the pressure vessel is rotating.

A system according to the preamble is described in International Patent Application WO 01/93704 A1. The pressure vessel of the system concerned is largely of double-walled construction. The inner wall is here provided with openings through which condensate can escape to the space between the inner wall and the outer wall of the pressure vessel. In the outer wall are provided passages via which the condensate can escape from the said space. The inner wall is further formed with a number of inwardly extending parts, which are also referred to as lifters or vanes. These lifters force the products to be peeled, such as, for example, potatoes, inwards, so that the products, during rotation of the pressure vessel, are well mixed in order that all products undergo a comparable steam treatment. Also at the site of the lifters, the inner wall is provided with openings for the condensate.

Owing to the use of the double-walled pressure vessel, the known system is relatively complex and dear to produce. Moreover, the space between the inner wall and the outer wall lends itself poorly to inspection. Perhaps for these reasons, the pressure vessel according to WO 01/93704 A1, at least insofar as is known, has not been used, or in any event not on a large scale.

The invention aims to provide a system which offers a solution to, or at least alleviates, the abovementioned problems and, moreover, enables a good evacuation of condensate during rotation of the pressure vessel, so that the steam-peeling process can be executed efficiently.

BRIEF SUMMARY

To this end, according to the invention, the at least one agitation member comprises at least one agitation member of a first type, which is connected to the wall and comprises an agitation body that, viewed in a cross section perpendicular to the rotational axis, has a convex shape and that, together with the wall of the pressure vessel, that means a part of the wall of the pressure vessel at the location of the agitation body, surrounds a cavity, wherein, on the front side (seen in the direction of rotation) of the agitation member of the first type, in the agitation body and/or between the agitation body and the wall, at least one flow opening is provided, preferably flow openings are provided, and wherein the agitation body, on the rear side of the agitation member, connects to the wall in a liquid-tight manner, so that condensate such as is formed within the pressure vessel during use can flow via the at least one flow opening, preferably flow openings into the cavity, that means can flow from the pressure space into the cavity, and cannot depart the cavity via the rear side of the agitation member, and wherein in that part of the wall (of the pressure vessel) which jointly surrounds the cavity is provided a further flow opening, which communicates with a collecting tank provided on the outer side of the pressure vessel, in order to further allow condensate to flow from the cavity via the further flow opening to the collecting tank. With such a system, the "collection" of condensate takes place not over the largest part of the wall of the pressure vessel, but in a concentrated manner at the site of the at least one agitation body of the first type. Through the provision of a further flow opening at the site of that at least one agitation body, the condensate can be directly evacuated from the cavity and thus from the pressure vessel. Apart from the function of "collecting" the condensate, the at least one agitation body of the first type also helps to achieve a good mixing of the product in the pressure vessel. Because there is no need to realize the pressure vessel in double-walled construction, the pressure vessel is relatively easy to inspect. Moreover, the rapid way in which, by virtue of the invention, the condensate can be evacuated from the pressure vessel offers the advantage of an efficient steam action upon the products to be peeled, which enables a relatively short steam cycle.

Especially from the production engineering aspect, it can be advantageous if the at least one agitation member has a longitudinal direction which extends parallel to the rotational axis.

It can further offer major advantages in terms of the process if the pressure vessel is at least substantially spherical. A spherical shape is eminently suitable for withstanding high pressures in the pressure vessel. By "at least substantially" is here meant the complete wall of the pressure vessel is spherical apart from possibly those regions of the wall where ports or openings, such as the flow opening, are provided. Moreover, the spherical shape serves to ensure that the condensate along the wall of the pressure vessel moves along a circular path and will hence tend to flow along the wall.

In order to promote a rapid evacuation of condensate from the pressure vessel, it can be preferable that the further flow opening is provided at a position in the wall for which it is the case that the distance between the wall and the rotational axis, viewed in a direction perpendicular to the rotational axis, is greatest. At this position, the centrifugal forces are greatest.

An extremely practical embodiment can be obtained if the agitation body of the agitation member of the first type is plate-shaped. A thus constructed agitation body can also be of relatively light construction, which has a favourable effect on the stability and velocity with which the pressure vessel can rotate.

Likewise from a practical viewpoint, it can be preferable that the agitation body belonging to the agitation member of the first type has on the front side thereof a foremost flat flank and has on the rear side thereof a rearmost flat flank, which foremost flank and which rearmost flank are connected to each other via a connecting edge and form an angle with each other. With the term "foremost", reference is made to the rotational direction in which the pressure vessel rotates during the feeding of steam. The "collection" of condensate via openings in the foremost flank can be promoted if the foremost flank forms a greater angle with the wall than does the rearmost flank. Thus, within the agitation body, there is obtained extra volume for the accommodation of condensate and extra surface area of the wall within the agitation body in which one or a number of flow openings are provided for the evacuation of the condensate.

In order to limit the effect that the agitation member of the first type forces condensate in the direction of the rotational axis, it can be preferable that at least a part of the flow openings belonging to the agitation member of the first type is delimited by the wall. Condensate which is found on the front side of the agitation member of the first type on the wall can thus flow freely via the wall into the cavity.

From a production engineering aspect, it can be advantageous if the agitation body belonging to the agitation member of the first type is connected directly to the wall via a weld joint.

In order to prevent the risk of vibration phenomena especially during the start-up of the rotation of the pressure vessel, it can be advantageous if at least one of the at least one agitation member of the first type is situated directly opposite the through opening. Thus the at least one agitation member of the first type can form, at least in part, a counterweight for the closure member.

Within that framework, it can also be advantageous if the collecting tank is rigidly connected to the pressure vessel and thus rotates together with the pressure vessel. The collecting tank can then be provided relatively close to the at least one agitation member of the first type. Moreover, in comparison with a fixedly arranged collecting tank, a rotating coupling between the pressure vessel and the collecting tank is thus dispensed with. Such couplings are fragile, complex and, partly as a result of this, prone to leakage.

In order to further promote agitation of the product in the pressure vessel, it can be advantageous if the at least one agitation member further comprises at least one agitation member of a second type, which comprises an agitation body that, viewed in a cross section perpendicular to the longitudinal direction of the agitation member, has a convex shape, wherein both on the front side and on the rear side of the agitation member of the second type, in the agitation body and/or between the agitation body and the wall, at least one flow opening is provided, so that condensate such as is formed within the pressure vessel during use can flow through successively the at least one flow opening on the front side of the agitation member and the at least one flow opening on the rear side of the agitation member, so that the condensate passes through the agitation member. An agitation member of the second type plays no part in the collection and evacuation of condensate from the pressure space.

In order to limit the effect that the agitation member of the second type forces condensate in the direction of the rotational axis, it can be preferable that at least a part of the flow openings belonging to the agitation member of the second type is delimited by the wall. The condensate can thus pass via these flow openings completely freely through the agitation member of the second type, whereby there is a high chance of the condensate being subsequently collected by an agitation member of the first type.

An extremely practical embodiment can be obtained if at the site of the agitation member of the second type, on the inner side of the wall, a number of spacers are provided, on the inner side of which spacers the agitation body is provided, and wherein the flow openings extend at least partly between neighbouring spacers. This offers especially advantages if the spacers are welded to the wall and if the agitation body is welded to the spacers, and then especially if the agitation body must be replaced, for example due to wear. This can then easily be ground off of the spacers and a new agitation body can subsequently be welded to the spacers without this having, or at least needing to have, a negative influence on the mechanical properties of the wall of the pressure vessel.

A further practical embodiment can be obtained if the spacers are strip-shaped and form flow channels between neighbouring spacers. The condensate can thus, via the flow channels whereof the flow openings form part, pass freely through the agitation member of the second type.

Alternatively, it can be advantageous, especially from a production engineering viewpoint, if the agitation body belonging to the agitation member of the second type is connected directly to the wall via a weld joint.

A yet further practical embodiment can be obtained if the agitation body of the agitation member of the second type is plate-shaped. A thus constructed agitation body can also be of relatively light construction, which has a favourable effect on the stability and velocity with which the pressure vessel can rotate.

BRIEF DESCRIPTION OF THE DRAWINGS

The invention will be explained in greater detail on the basis of the description of a possible embodiment of a system according to the invention, with reference to the following figures.

DETAILED DESCRIPTION

The system 1 for the steam-peeling of products having a skin, such as, typically, potatoes 9, comprises a pressure vessel 2. The pressure vessel 2 is at least largely spherical and is of single-walled construction having a wall 3. The wall 3 surrounds a pressure space 4 of the pressure vessel 2. For the feeding of potatoes 9, a through opening 5 is provided in the wall 3 (see FIG. 5a). In the immediate vicinity of the through opening 5, the pressure vessel 2 is not spherical. The pressure vessel 2 further comprises a closure member 6, with which the through opening 5 can be closed off. The closure member 6 is constructed as a hinged cap, which on the side facing the pressure space 4 (in the closed state) has a (truncated) conical shape.

Figure 1:
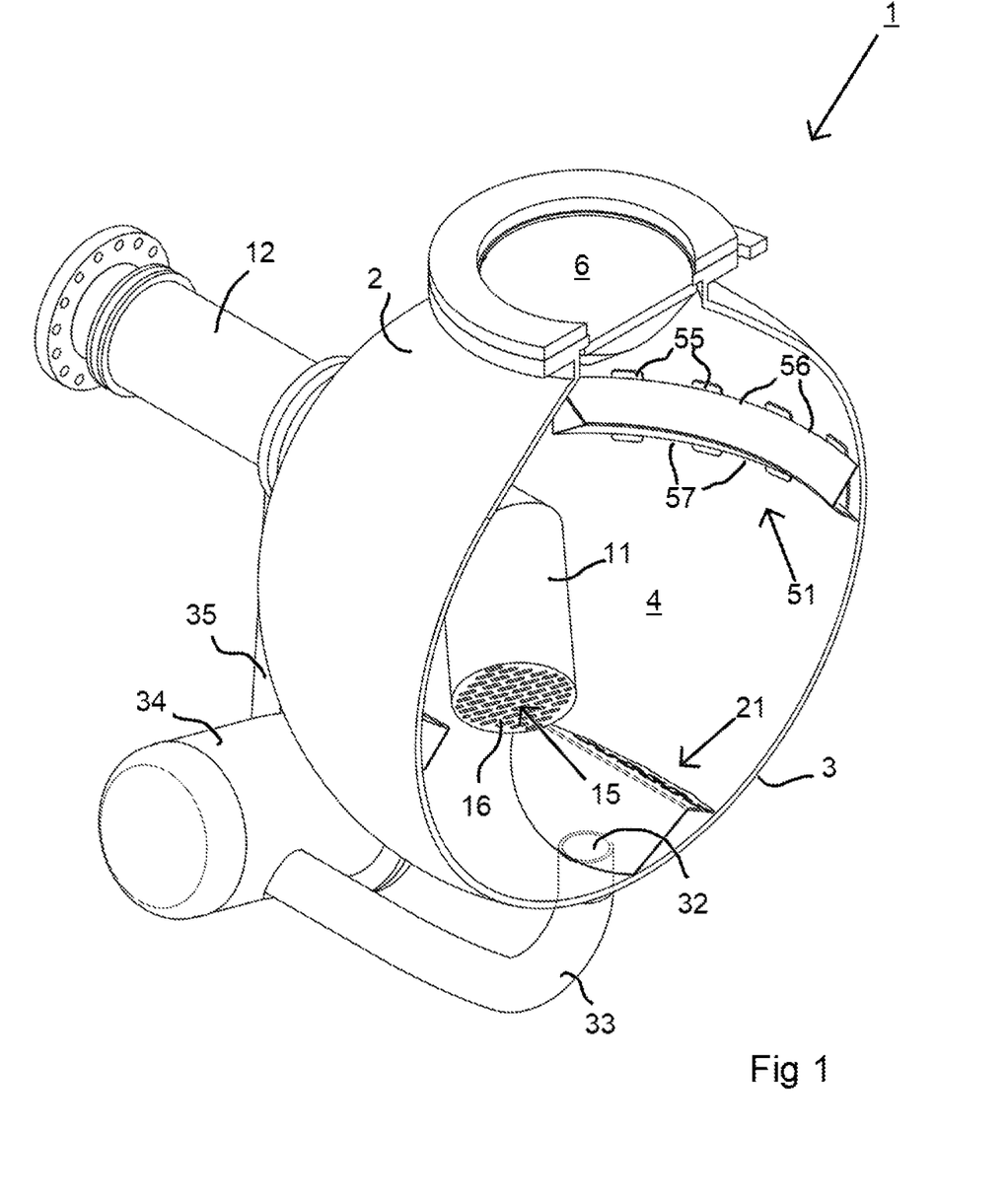
FIG. 1 shows an open isometric view of a system according to the invention for the steam-peeling of products.
Figure 2A:
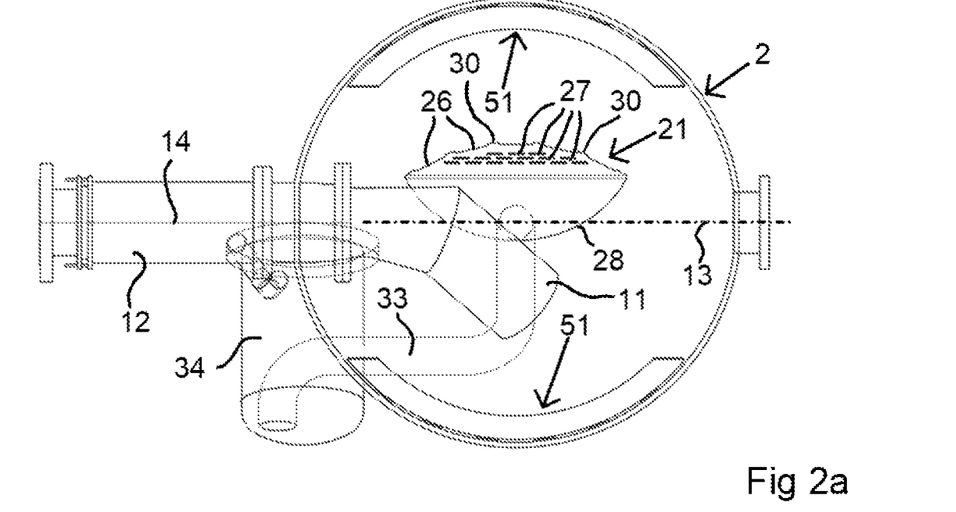
FIGS. 2a to 2c show three perpendicular views of the system according to FIG. 1.

A steam basket 11 opens out, via a mouth 15 thereof, into the pressure space 4, which steam basket 11 is connected to a steam shaft 12, which extends on the outer side of the pressure vessel 2. In the mouth 15 are provided slotted holes 16, through which steam can flow. Also holes, for example comparable with slotted holes 16, are provided in the cylindrical wall of the steam basket 11. The pressure vessel 2 is rotatable about a rotational axis 13 which coincides with the centre line 14 of the steam shaft 12 (see FIG. 2a). The mouth 15 of the steam basket 11 is situated at a distance from the rotational axis 13, and the direction of this mouth 15 forms an angle of about 45 degrees with the rotational axis 13. The arrangements of the system 1 for rotating the pressure vessel 2 about the rotational axis 13 are not represented, since the embodiment of these arrangements are not of importance to the invention and, moreover, are known to the person skilled in the art. During operation, via the inside of the steam shaft 12 and via the steam basket 11, more specifically the mouth 15 thereof, steam can be fed to the pressure space 4, whilst the pressure vessel 2 rotates about the rotational axis 13 in the rotational direction 23.

Figure 3:
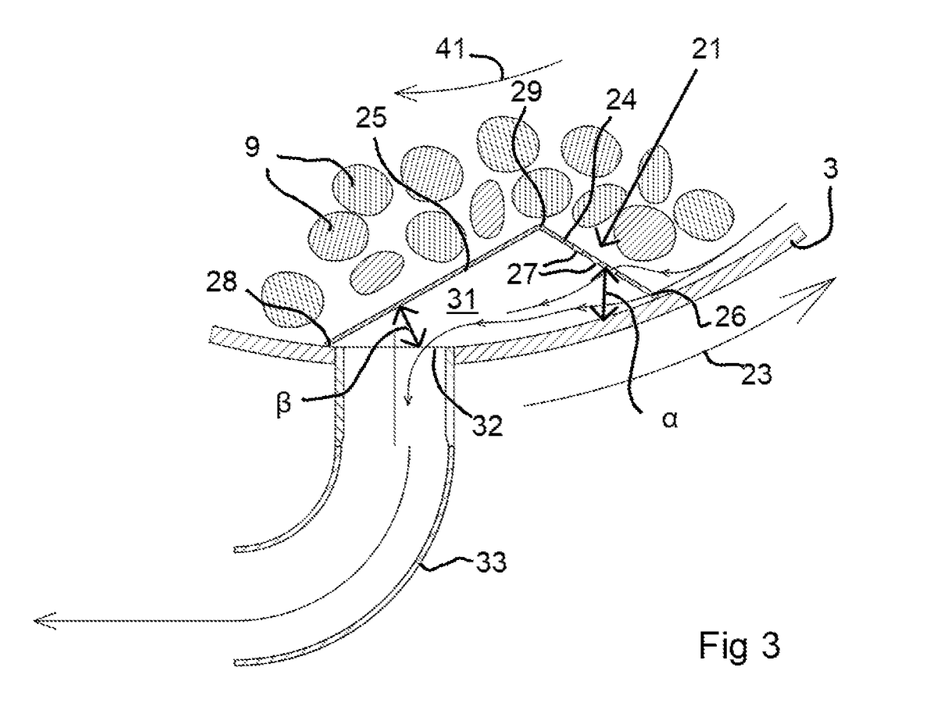
FIG. 3 shows in vertical cross section a part of the pressure vessel according to the system according to the preceding figures in the vicinity of an agitation member of the first type.

Directly opposite the through opening 5, the pressure vessel 2 is on the inner side of the wall 3 provided with an agitation member 21 of a first type. With reference to FIG. 3, the agitation member 21 comprises a plate-shaped agitation body 22 having an, at least in vertical cross section, convex shape. Starting from the rotational direction 23, the agitation body 22 has a foremost flank 24 and a rearmost flank 25. The foremost flank 24 and the rearmost flank 25 are connected to each other via a connecting edge 29, which has a straight course. The straight course of the connecting edge 29 offers the advantage that the agitation body 22 can be produced relatively simply. The agitation body 22 has an elongate shape, wherein the longitudinal direction of the agitation body 22 extends parallel to the rotational axis 13. The foremost flank 24 forms an angle α with the wall 3 which is greater than the angle β which the rearmost flank 25 forms with the wall 3. In the foremost flank 24 are provided flow openings 26, 27. The flow openings 26, 27 are significantly smaller than the dimensions of potatoes 9, so that potatoes 9 cannot pass through the flow openings 26, 27, in contrast to condensate which is formed in the pressure space 4 during the steam-peeling process. Flow openings 26 connect directly to the wall 3, whilst flow openings 27 relate to holes which are made in the foremost flank 24 at a distance from the peripheral edge thereof. Between the flow openings 26 there are bridging parts 30, which connect to the wall 3 and via which the agitation body 22 is welded to the wall 3.

The rearmost flank 25 is completely closed and connects to the wall 3 in a liquid-tight manner at the site of the rear edge 28. The wall 3 and the agitation body 22 surround a cavity 31 in which, during operation, condensate flows along the inner side of the wall 3 via flow openings 26, 27 during rotation of the pressure vessel 4 in the rotational direction 23. In the wall 3 is provided inside the cavity 31, in the middle of the length thereof, close to the rear edge 28, a further flow opening 32, to which there connects an evacuation line 33. The evacuation line 33 opens out, via a siphon 36, into a collecting tank 34, which is rigidly connected to the pressure vessel 2. The collecting tank 34 is itself again connected to the steam shaft 12 via the evacuation line 35. The siphon 36 prevents condensate from flowing from the collecting tank 34 back into the pressure vessel 4 during operation.

As indicated above, the pressure vessel 2 rotates during operation in the rotational direction 23. The condensate which, owing to the use of steam, is formed within the pressure space 4 has the tendency, due to the rotation of the pressure vessel 2 and due to centrifugal forces, to move towards and against the inner side of the wall 3, more specifically in the region having the largest diameter. The condensate, just as, moreover, potatoes 9, owing to the conical shape of the closure member 6, will also be forced out of the region having the largest diameter. Due to gravitational force, the condensate, as well as the potatoes 9, will move with respect to the agitation body 22 in a direction of displacement 41, thus oppositely to the rotational direction 23. The potatoes 9 will hereupon come into contact with the inclined foremost flank 24 and will thereby be forced in the direction of the rotational axis 13. The condensate, however, will flow via the flow openings 26, 27 into the cavity 31, so as subsequently to flow due to the centrifugal forces, via a further flow opening 32 and an evacuation line 33, to the collecting tank 34. Thus the condensate is efficiently evacuated from the pressure space 4.

Figure 2B:
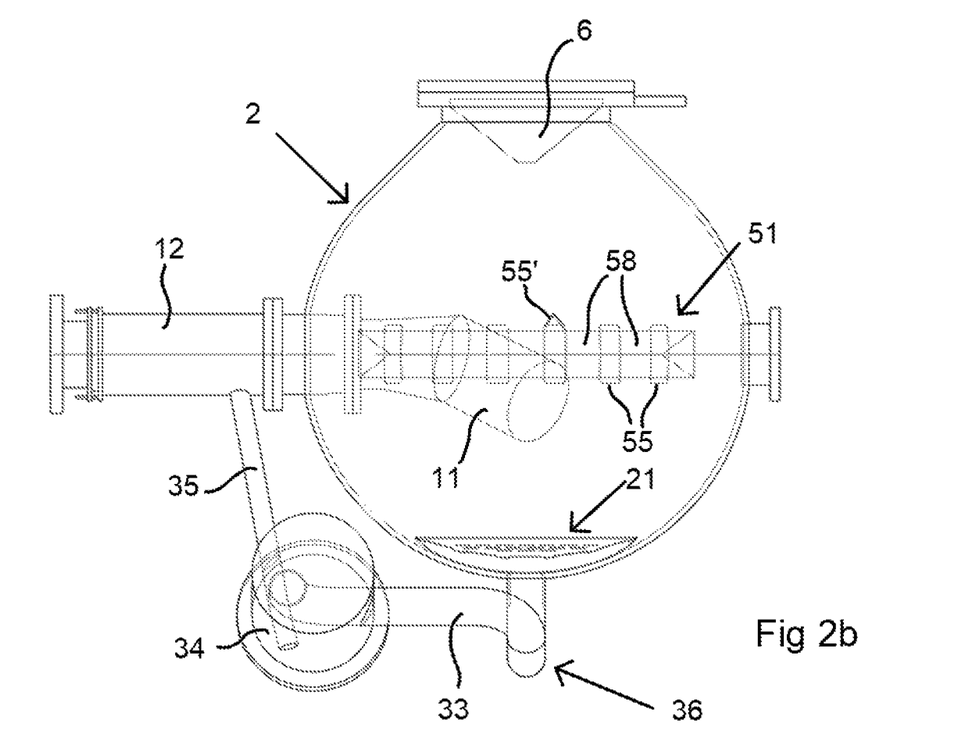
Figure 2C:
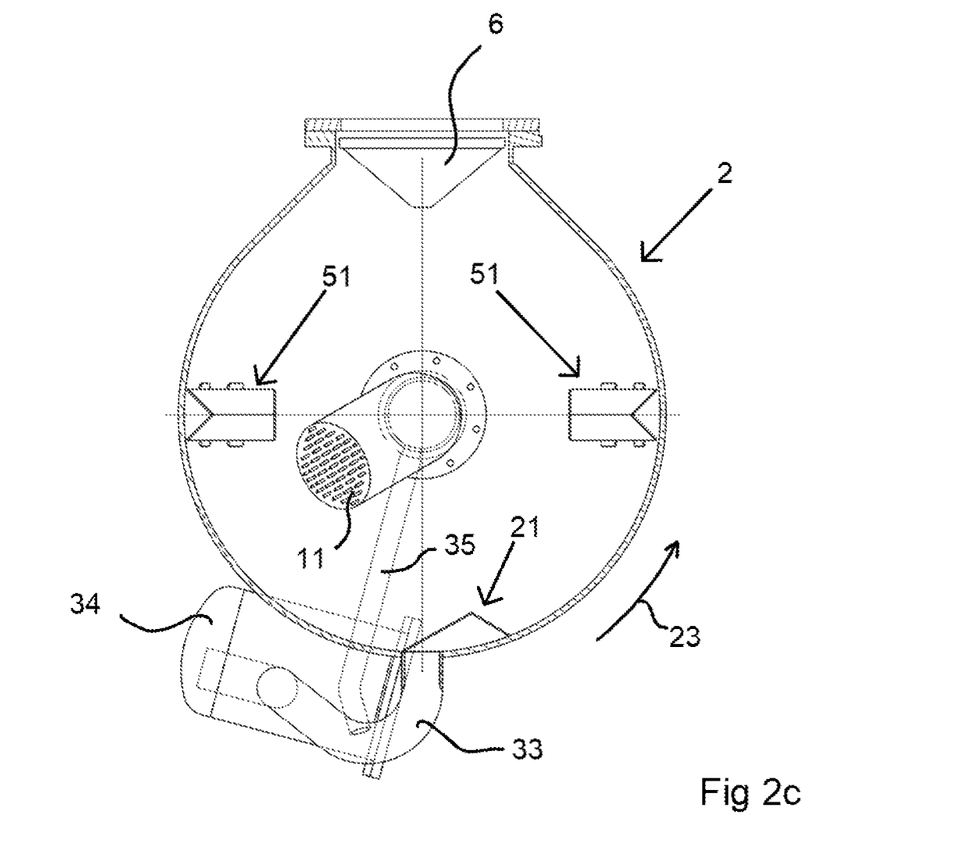
Figure 4:
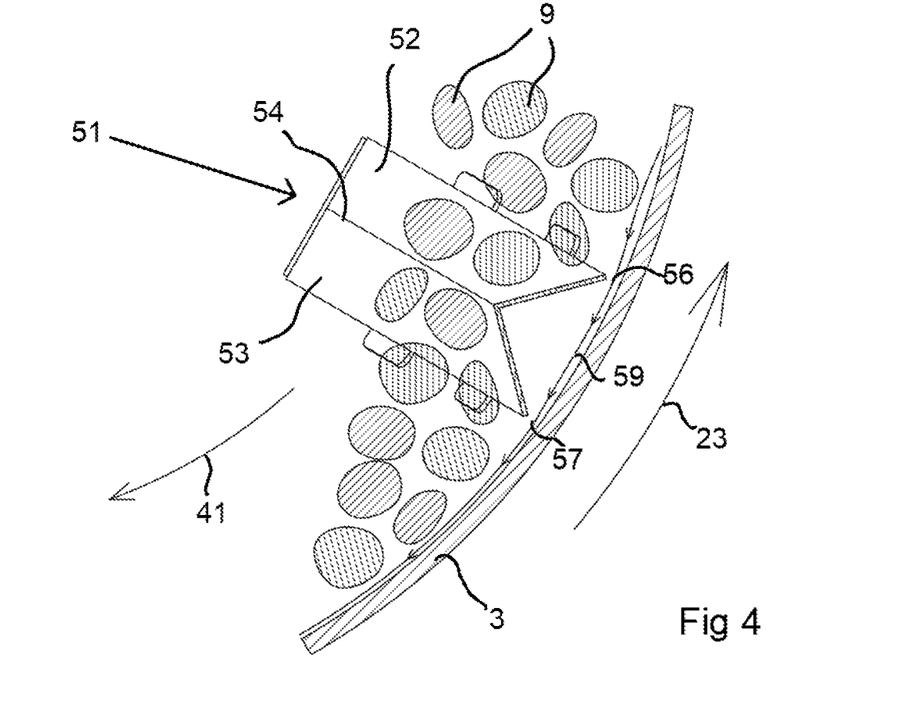
FIG. 4 shows in vertical cross section a part of the pressure vessel according to the system according to the preceding figures in the vicinity of an agitation member of the second type.

In order to obtain more agitation of the potatoes 9 in the pressure space 4, the pressure vessel 2, on the inner side of the wall 3, is further provided with two agitation members 51 of the second type. These two agitation members 51 are provided directly opposite each other and are located approximately at equal distance from the agitation member 21. Other than the agitation member 21, agitation members 51 are not designed to "collect" the condensate. Rather, agitation members 51 are designed to allow the condensate bearing against the inner side of the wall 3 to pass through freely. Agitation members 51 have an elongate shape, wherein the longitudinal direction follows the curvature of the wall 3 and extends at least substantially parallel to the rotational axis 13. Agitation members 51 are made of a plate which has been rolled such that there is a foremost flank 52 and a rearmost flank 53, which are connected to each other according to a curved connecting edge 54. In cross section, the flanks 52, 53 define a convex shape. The curved (concave) shape of the connecting edge 54 has the effect that the agitation members 51 act less aggressively on the potatoes 9, and that the agitation members 51 occupy less space within the pressure vessel 2. At the site of the agitation members 51, to the inner side of the wall 3 are welded a number of strip-shaped spacers 55, which extend parallel to one another and to the rotational direction 23. The agitation members 51 are in turn welded onto the strip-shaped spacers 55. Between the wall 3, neighbouring spacers 55 and the foremost flank 52 are formed flow openings 56, whilst between the wall 3, neighbouring spacers 55 and the rearmost flank 53 there are flow openings 57. In other words, it can also be stated that between neighbouring strip-shaped spacers 55 there are flow channels 58 through which condensate can flow according to the arrow 59 without hindrance from the agitation members 51. Within this framework, it is also possible to make the strip-shaped spacers 55 on the front side pointed, as is represented in FIG. 2b for one of the spacers 55, denoted by the reference numeral 55'. In addition, it is possible to make in the foremost flank 52 flow openings through which condensate can pass, which condensate is subsequently forced by the inner side of the rearmost flank 53 back in the direction of the wall 3. Alternatively, it is moreover also possible, for example, to construct agitation members 51 not with spacers 55, but instead to construct the foremost flank 52 and the rearmost flank 53 with bridges, comparable with bridges 30, and with intervening flow openings, comparable with flow openings 26, and/or to make the connecting edge 54 straight, comparable with the connecting edge 29.

Figure 5A:
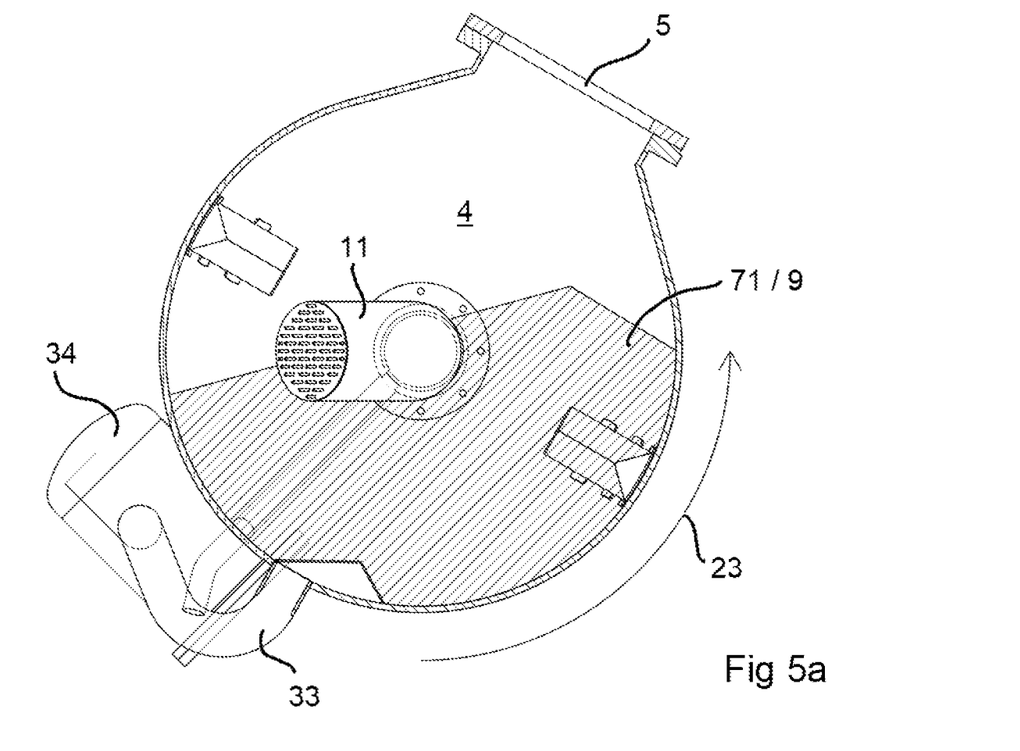
FIGS. 5a and 5b show in vertical cross section the system according to FIG. 4 in different phases of the steam-peeling process.

FIG. 5a indicates with the hatchings 71 the region which is occupied by potatoes 9 directly after the filling of the pressure vessel 2 via the opened through opening 5. The through opening is here directed obliquely upwards, in FIG. 5a to the right, whilst the steam basket 11 is directed horizontally to the left. Once the through opening 5 has been closed with the closure member 6, the pressure vessel 2 is set in rotation about the rotational axis 13 in the rotational direction 23. At the same time, steam is fed directly via the steam basket 11 to the pressure space 4. Since the steam basket 11, during the first half-revolution in the rotational direction 23, moves through the potatoes 9 in the region 71, the steam is fed as directly as possible to the potatoes 9, so that these are directly exposed as much as possible to the activity of the steam.

Figure 5B:
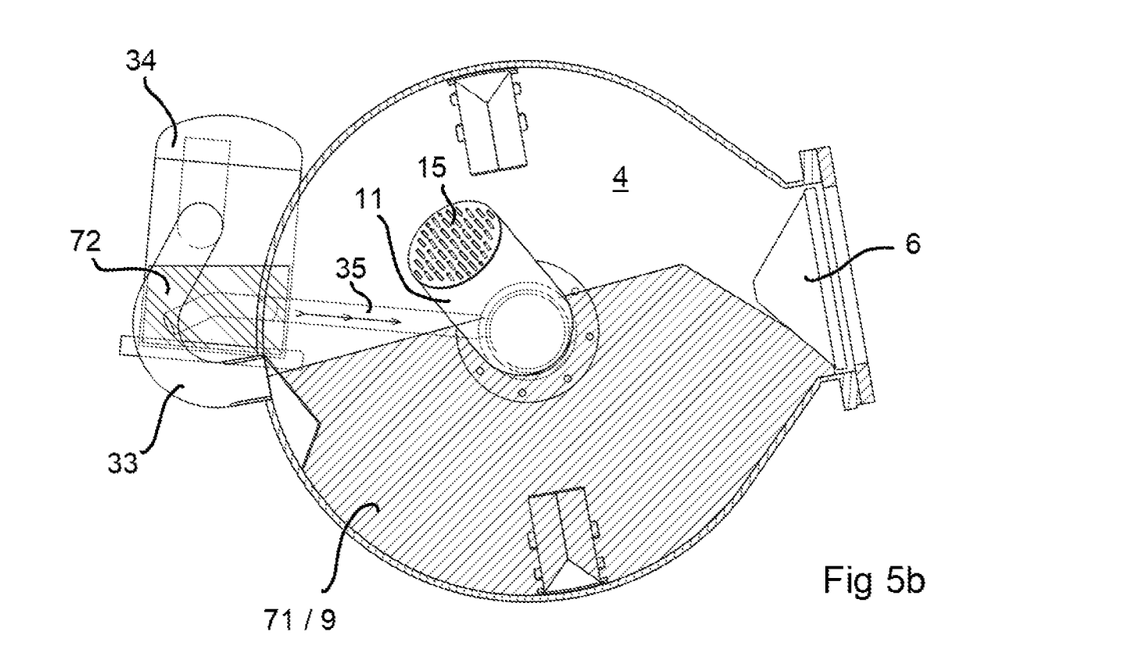

FIG. 5b shows the situation at the end of a steam cycle, wherein the through opening is directed practically in the horizontal direction. The collecting tank 34 is filled with condensate 72, which is collected with the aid of the agitation member 21. The steam basket 11 is directed obliquely upwards and the mouth 15 thereof is completely free of potatoes 9. Subsequently, an underpressure is created in the steam shaft 12, whereby steam in the pressure space 4, via the steam basket 11, is evacuated from the pressure space 4, whilst at the same time the condensate 72 is sucked out of the collecting tank 34, according to the arrow 73, via the evacuation line 35. The length of the steam cycle can be relatively short, for example typically between 5 and 15 seconds, owing to the efficient and equal way in which the potatoes 9 are subjected during the steam cycle to the activity of the steam, and owing to the effective way in which condensate, shortly after the formation thereof, is evacuated from the pressure space 4. The steam cycle is determined by the time interval between the admission of steam into the pressure space 4 and the evacuation of steam from the pressure space, inter alia via the steam basket 11.

Although the invention has previously been explained on the basis of potatoes 9 to be peeled, the invention can also advantageously be used with other products having a skin, such as carrots, celeriac, beetroot, kohlrabi parsnips and sweet potatoes.

The invention claimed is:

1. A system for the steam-peeling of products having a skin, comprising:
    a pressure vessel rotatable about a rotational axis in a rotational direction and having a wall which surrounds a pressure space of the pressure vessel, wherein in the wall is provided a through opening for feeding products into the pressure space via the through opening and for evacuating products from the pressure space via the through opening, the pressure vessel further comprising a closure member for closing off the through opening;
    a feeder for feeding steam to the pressure space; and
    an evacuator for evacuating steam and condensate from the pressure space;
    wherein the pressure vessel, on an inner side of the wall, is provided with at least one agitation member for the radially inward movement of products during rotation of the pressure vessel about the rotational axis, wherein the at least one agitation member comprises at least one agitation member of a first type, which is connected to the wall and comprises an agitation body that, viewed in a cross section perpendicular to the rotational axis, has a convex shape, and that, together with the wall of the pressure vessel, surrounds a cavity, wherein on the front side of the agitation member of the first type, in the agitation body and/or between the agitation body and the wall, at least one flow opening is provided, and wherein the agitation body, on the rear side of the agitation member, connects to the wall in a liquid-tight manner, so that condensate such as is formed within the pressure vessel during use can flow via the at least one flow opening into the cavity and cannot depart the cavity via the rear side of the agitation member, and wherein in that part of the wall which jointly surrounds the cavity is provided a further flow opening, which communicates with a collecting tank provided on the outer side of the pressure vessel, in order to further allow condensate to flow from the cavity via the further flow opening to the collecting tank.

2. The system according to claim 1, wherein the at least one agitation member has a longitudinal direction which extends parallel to the rotational axis.

3. The system according to claim 1, wherein the pressure vessel is at least substantially spherical.

4. The system according to claim 1, wherein the further flow opening is provided at a position in the wall where a distance between the wall and the rotational axis, viewed in a direction perpendicular to the rotational axis, is greatest.

5. The system according to claim 1, wherein the agitation body of the agitation member of the first type is plate-shaped.

6. The system according to claim 1, wherein the agitation body belonging to the agitation member of the first type has on the front side thereof a foremost flat flank and on the rear side thereof a rearmost flat flank, which foremost flank and which rearmost flank are connected to each other via a connecting edge and form an angle with each other.

7. The system according to claim 6, wherein the foremost flank forms a greater angle with the wall than does the rearmost flank.

8. The system according to claim 1, wherein at least a part of the flow openings belonging to the agitation member of the first type is delimited by the wall.

9. The system according to claim 1, wherein the agitation body belonging to the agitation member of the first type is connected directly to the wall via a weld joint.

10. The system according to claim 1, wherein at least one of the at least one agitation member of the first type is situated directly opposite the through opening.

11. The system according to claim 1, wherein the collecting tank is rigidly connected to the pressure vessel.

12. The system according to claim 1, wherein the at least one agitation member further comprises at least one agitation member of a second type, which comprises an agitation body that, viewed in a cross section perpendicular to the longitudinal direction of the agitation member, has a convex shape, wherein both on the front side and on the rear side of the agitation member of the second type, in the agitation body and/or between the agitation body and the wall, at least one flow opening is provided, so that condensate such as is formed within the pressure vessel during use can flow through successively the at least one flow opening on the front side of the agitation member and the at least one flow opening on the rear side of the agitation member, so that the condensate passes through the agitation member.

13. The system according to claim 12, wherein at least a part of the flow openings belonging to the agitation member of the second type is delimited by the wall.

14. The system according to claim 13, wherein at the site of the agitation member of the second type, on the inner side of the wall, a number of spacers are provided, on the inner side of which spacers the agitation body is provided, and wherein the flow openings extend at least partly between neighbouring spacers.

15. The system according to claim 14, wherein the spacers are strip-shaped and form flow channels between neighbouring spacers.

16. The system according to claim 12, wherein the agitation body belonging to the agitation member of the second type is connected directly to the wall via a weld joint.

17. The system according to claim 12, wherein the agitation body of the agitation member of the second type is plate-shaped.

* * * * *